Oct. 22, 1968     J. KIRSCH ET AL     3,406,837
LIFTING AND SWINGING WORK TRANSFER DEVICE
Filed Oct. 13, 1966     4 Sheets-Sheet 1
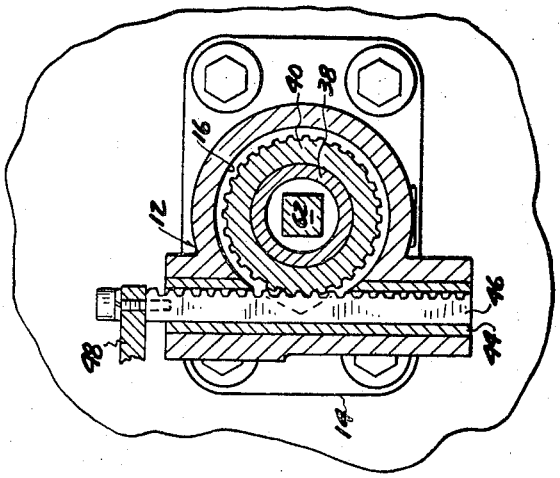
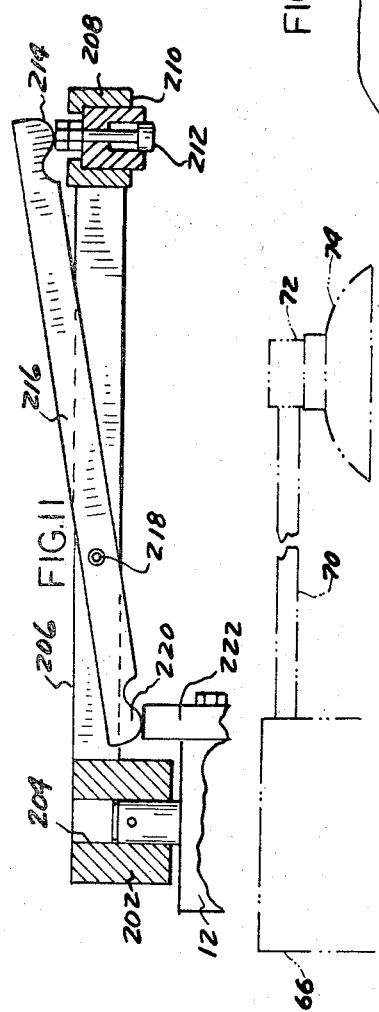
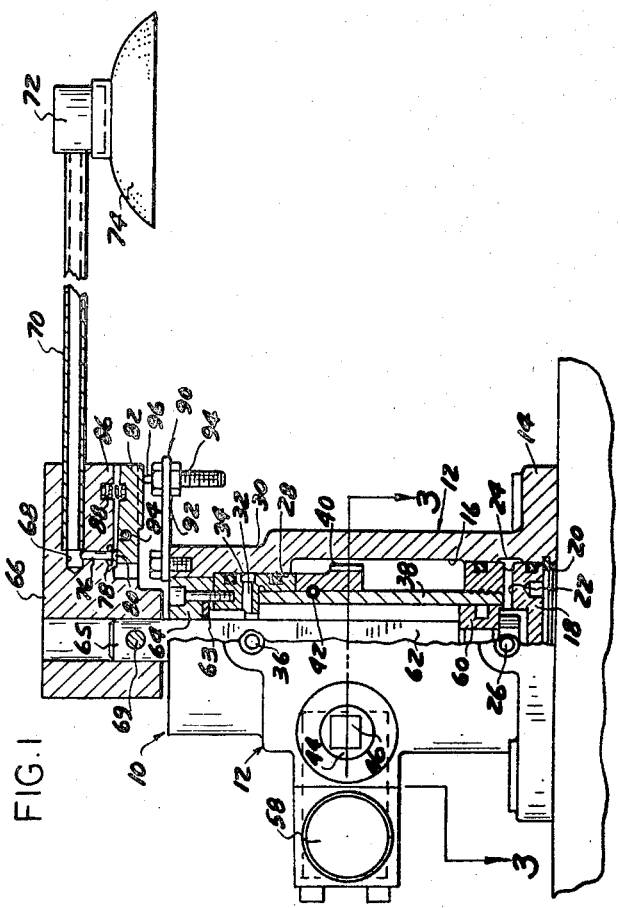
INVENTORS
JERRY KIRSCH
GEORGE D. ROBB
BY Barthel & Bugbee
ATTORNEYS

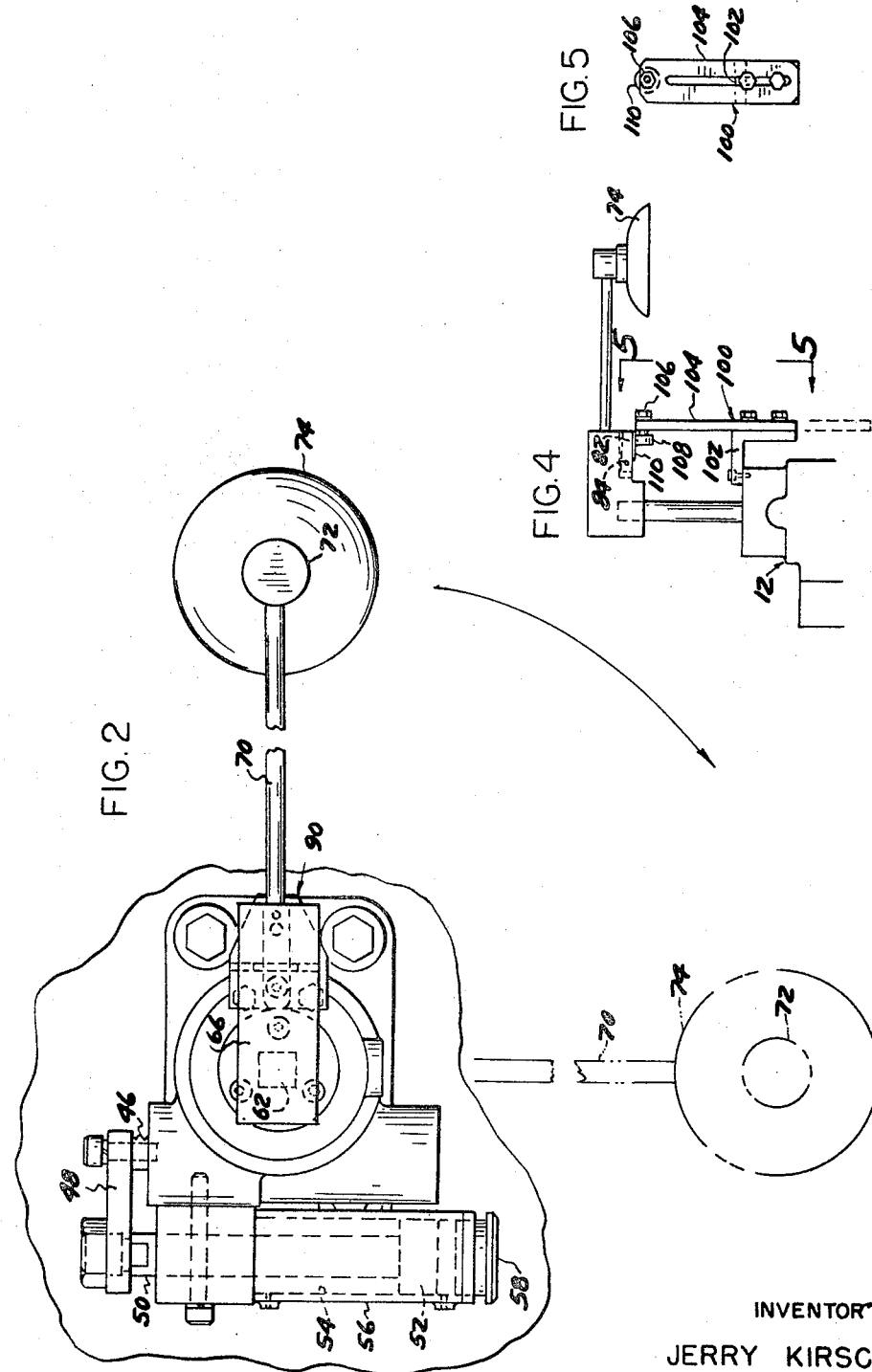

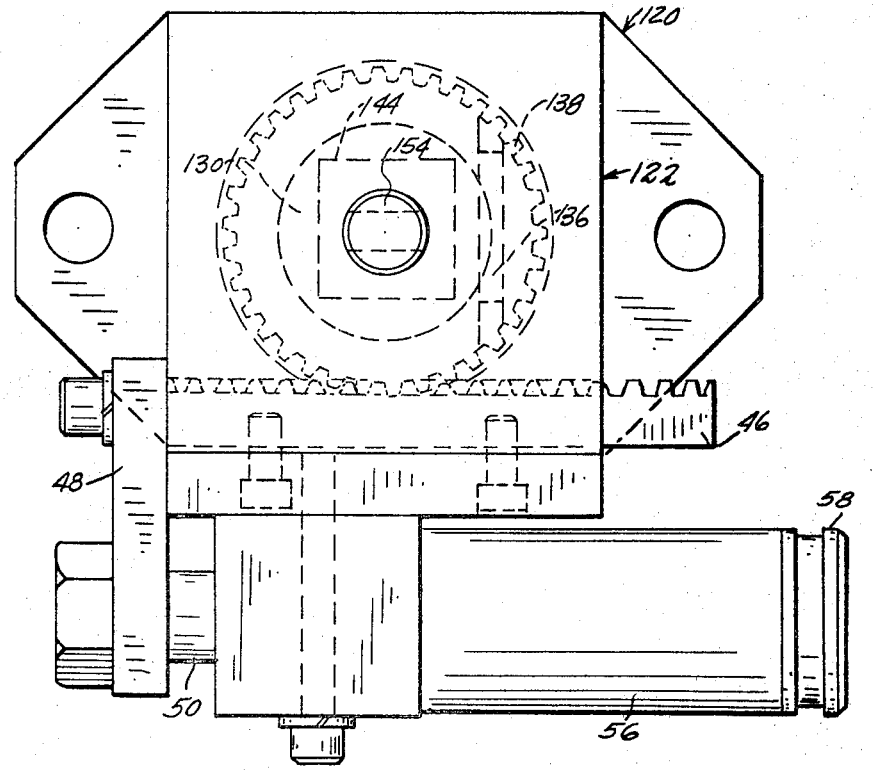
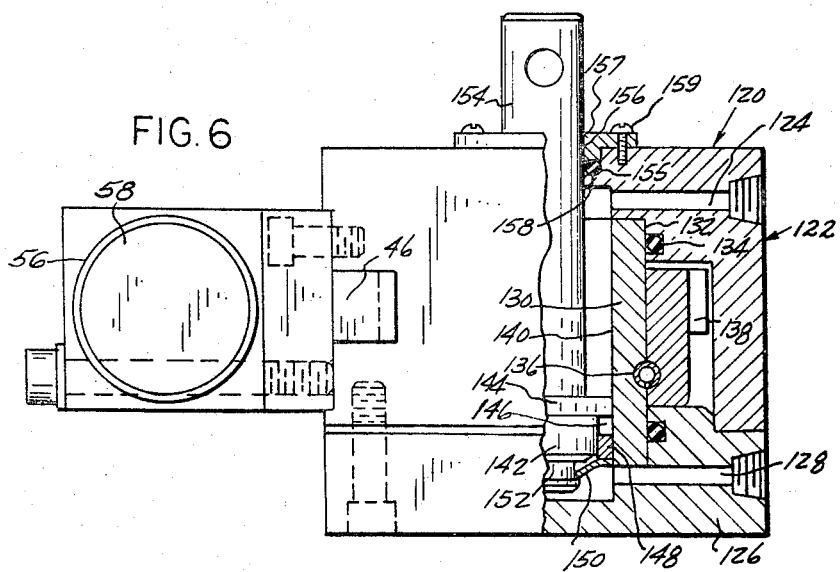

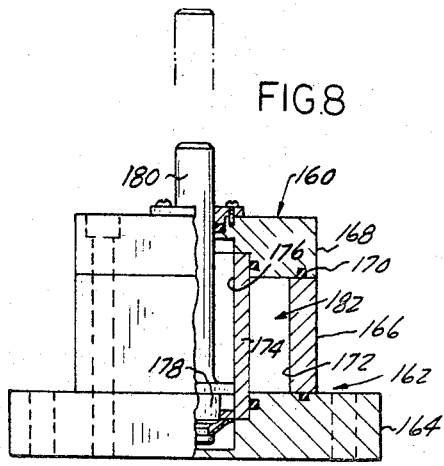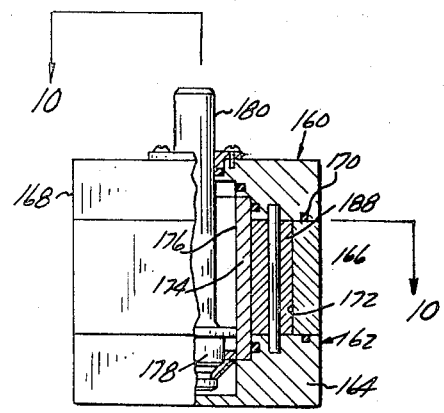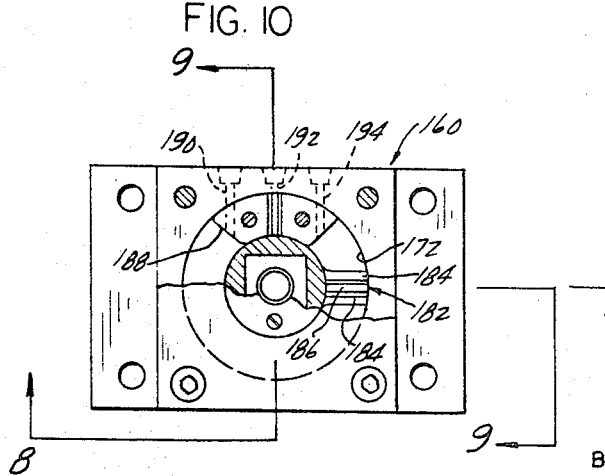

United States Patent Office 3,406,837
Patented Oct. 22, 1968

3,406,837
LIFTING AND SWINGING WORK
TRANSFER DEVICE
Jerry Kirsch, Grosse Pointe Farms, and George D. Robb, Birmingham, Mich., assignors to Erie Engineering Company, Detroit, Mich., a corporation of Michigan
Filed Oct. 13, 1966, Ser. No. 586,524
6 Claims. (Cl. 214—1)

ABSTRACT OF THE DISCLOSURE

This lifting and swinging work transfer device is operated pneumatically, and automatically swings into position over a workpiece, descends into gripping engagement with the workpiece, ascends while lifting the workpiece, swings horizontally to a predetermined location, and there descends and releases the workpiece at the last fraction of vertical travel, the swinging being accomplished either by a reciprocatory or a rotary pneumatic motor, and the workpiece gripping either by a vacuum or magnetic gripper, or by mechanical gripper jaws.

---

FIGURE 1 is a side elevation, partly in central vertical section, of a work transfer device according to one form of the invention, with the raised position of the work gripper shown in dotted lines;

FIGURE 2 is a top plan view of the work transfer device shown in FIGURE 1;

FIGURE 3 is a horizontal cross-section taken along the line 3—3 in FIGURE 1;

FIGURE 4 is a fragmentary side elevation, on a reduced scale, of the upper portion of FIGURE 1, equipped with a modified work release tripper;

FIGURE 5 is a side elevation of the tripper shown in FIGURE 4, looking in the direction of the line 5—5 therein;

FIGURE 6 is a side elevation of a modified work transfer device;

FIGURE 7 is a top plan view of the modification of FIGURE 6;

FIGURE 8 is a side elevation partly in central vertical section and on a reduced scale of a further modification employing a rotary pneumatic motor for swinging the workpiece transfer gripper, taken along the line 8—8 in FIGURE 10;

FIGURE 9 is an end elevation partly in central vertical section at right angles to FIGURE 8, taken along the line 9—9 in FIGURE 10, with the work transfer arm omitted to simplify the disclosure;

FIGURE 10 is a top plan view, partly in horizontal section, along the line 10—10 in FIGURE 9; and FIGURE 11 is a side elevation, partly in central vertical section, of a magnetic pickup usable with any of the previously-described workpiece transfer devices.

Referring to the drawings in detail, FIGURES 1, 2 and 3 show a lifting an swinging work transfer device, generally designated 10, according to one form of the invention as including a main housing 12 (FIGURE 1) with a base mounting flange 14 and a vertical bore 16 closed by a cup-shaped sealed lower head 18. The housing 12 at the bottom of the bore 16 is grooved to receive a snap ring 20 which holds the head 18 in place. The head 18 is provided with a radial lower port 22 which leads from the inner side thereof to an annular groove 24 which in turn leads to a lower cylinder port 26. The upper end of the bore 16 has a reduced diameter portion 28 closed by an annular sealed inner upper head 30 containing a radial upper port 32 leading to an annular groove 34 which in turn communicates with an upper cylinder port 36. The lower head 18 is internally threaded to receive the correspondingly-threaded lower end of a vertical work-lifting cylinder 38, the upper end of which is seated in the annular upper head 30.

Mounted on the outer side of the vertical lifting cylinder 38 is a ring gear 40, the hub of which and the cylinder 38 are tangentially drilled to receive a roll pin 42 establishing a driving connection therebetween. The housing 12 is bored horizontally to the vertical bore 16 at the level of the ring gear 40 to receive a square-bored sleeve 44 in which a toothed rack bar 46 is reciprocably mounted in mesh with the ring gear 40 (FIGURE 3). The outer rearward end of the rack bar 46 (FIGURE 3) is drilled and threaded, and bolted to it is one end of a cross head 48, the other end of which is bolted to the drilled and threaded outer end of the piston rod 50 of a pneumatic piston 52 (FIGURE 2) which is reciprocably mounted within the cylinder bore 54 of a horizontal pneumatic work swinging cylinder 56 having a cylinder head 58. The cylinder 56 is bolted to the side of the main housing 12.

Reciprocably mounted within the vertical cylinder 38 is a lifting piston head 60 connected to a lifting piston rod 62 of square cross-section (FIGURE 2) which passes upward through a square-bored sealed outer head 64 seated in the upper end of the housing 12 and bolted to the inner head 30 with a packing 63 clamped therebetween. Pinned at 69 to the transversely-drilled upper end 65 of the square piston rod 62 is a swivel block 66 with a vertical square bore 67 therein. One side of the swivel block 66 is horizontally bored and counterbored at 68 (FIGURE 1) to air-tightly receive a tubular horizontal arm 70 which leads to the hollow head 72 of a resilient work-gripping vacuum cup 74 of elastomeric material, such as natural or synthetic rubber. Leading into the bore 68 of the swivel block 66 is a port 76, the outer or lower end of which is annularly grooved to receive a resilient elastomeric valve seat 78. Engageable with the valve seat 78 is a valve member 80 mounted on the upper side of one end of a tilting valve block 82 pivotally mounted upon a pivot pin 84 secured at its opposite ends to the swivel block 66, which is recessed at 86 to receive the valve block 82. Both the valve block 82 and the recessed portion 86 of the swivel block 66 are further recessed on the opposite side of the valve block 82 from the valve member 80 to receive a compression spring 88. Bolted to the upper end of the housing 12 is a valve tripping device 90 consisting of a bracket arm 92, the outer end of which carries the threaded barrel 94 of a spring-cushioned reciprocable valve-tripping plunger 96.

The modified valve-tripping device 100 shown in FIGURES 4 and 5 eliminates the need for the swivel block 66 in FIGURES 1, 2 and 3 to descend before it can actuate the valve tripping device 90 and drop the workpiece. Instead, the valve-tripping device 100 consists of an inverted L-shaped angle bracket 102 bolted to the top of the housing 12 and extending downwardly therefrom. Adjustably bolted to the angle bracket 102 is a verticallydisposed slotted bar 104, the upper end of which is drilled transversely to receive an axle bolt 106 carrying a valve-tripping cam follower roller 108 engageable with a contact portion 110 on the lower side of the valve block 82. The slotted construction of the bar 104 enables it to be adjusted upward or downward to vary the level at which the cam follower roller engages the valve block 82 to tilt it and thereby break the vacuum in the work-gripping vacuum cup 74. Thus, when the swivel block 66 rotates in a horizontal plane after picking up the workpiece, it drops the workpiece as soon as the bottom of the valve block 82 engages the roller 108 and tilts to move the valve member 80 away from its seat 78 to break the vacuum in the cup 74, as in FIGURE 1.

The modified work transfer device, generally designated 120, shown in FIGURES 6 and 7, is generally similar to the work transfer device of FIGURES 1, 2 and 3, but differs from it in the construction of the means for raising and lowering the swivel block 66, lifting arm 70 and work-gripping vacuum cup 74 which are omitted from FIGURES 6 and 7. Accordingly, similar parts are designated with the same reference numerals as in FIGURES 1, 2 and 3. In place of the round piston head 60 and square piston rod 62, which were found more difficult to machine and tightly seal at 63, the work transfer device 120 employs a main housing 122 containing an upper fluid port 124 and a closure head 126 therefor containing a lower port 128 opening into the upper and lower ends respectively of a vertical lifting cylinder 130 having a cylindrical outer surface 132 sealed by upper and lower O-rings 134 and drivingly connected by a tangential roll pin 136 to a pinion 138. The latter in turn meshes with the rack 46 in the same manner as described in connection with the work transfer device 10.

The work lifting cylinder 130 of FIGURE 6 contains a bore 140 of square cross-section in which is reciprocably mounted a piston head 142 also of square cross-section having a square abutment portion 144 against which a hollow square packing 146 is held by a hollow square retainer 148 urged thereagainst by a so-called push-button fastener 150 or a snap ring under slight compression mounted on the grooved lower end portion 152 of a cylindrical piston rod 154. The piston rod 154 passes through a cylindrical bore 156 in the upper end of the main housing 122 and is sealed by an O-ring 158. For convenience of replacement, the O-ring 158 is mounted in an annular recess or counterbore 155 coaxial with the bore 156 and closed at its upper end by a bronze flanged bushing 157 removably secured as by the screws 159 to the top of the housing 122. As before, the piston rod 154 is drilled diametrically in order to be pinned to the swivel block 66. In its installed position, the work transfer device 10 or 120 is connected to an air compressor through suitable valves operated in timed relationship such as by solenoids controlled by switches operated by cams from a conventional electrical timing motor or by air-operated timed-sequence valves (not shown), so as to carry out the sequence of operations described below.

In the operation of the work transfer device 10 or 120 of FIGURES 1 to 3 inclusive or 5 and 6, pressure fluid, such as compressed air, supplied to the lower port 24 or 128 of the cylinder 38 or 130 and exhausted from the upper end thereof causes the piston 60, 62 or 142, 154 to rise, moving the swivel block 66 and vacuum workpiece gripping cup 74 upward away from the stop. When the vacuum cup 74 has reached its desired height, as shown in dotted lines in FIGURE 1, pressure fluid is supplied to the rearward end 58 of the horizontal cylinder 56 and exhausted from the forward end thereof, causing the piston 52, 50 to move rearwardly (FIGURE 2), carrying with it the cross head 48 and rack 46, thereby rotating the pinion 40 or 138 and consequently rotating the cylinder 38 or 130 pinned to it with resulting rotation of the piston rod 62 or 154 clockwise through the desired angle of swing, for example an approximately quarter revolution. This action swings the swivel block 66, tubular arm 70 and vacuum cup 74 through approximately 90 degrees at its raised level (FIGURE 1), whereupon pressure fluid is supplied to the upper cylinder port 36 or 124 and exhausted from the lower cylinder port 26 or 128 of the cylinder 38 or 130, causing the piston rod 62 or 154 and swivel block 66, tubular arm 70, hollow head 72 and vacuum cup 74 to descend while the port 76 has been closed by the spring 88 swinging the valve member 82 around the pivot pin 84 while out of engagement with the valve-tripping plunger 96 or roller 108.

As the vacuum cup 74 is pressed downward and flattened against the workpiece and air therein is consequently expelled from the vacuum cup 74 by reason of its resilience, a suction is created within the vacuum cup 74 which firmly grips the workpiece when the vacuum cup 74 seeks to resume its normal shape.

The work-gripping vacuum cup 74 and the workpiece suctionally held by it are now lifted by supplying pressure fluid to the lower cylinder port 26 or 128 while exhausting fluid from the upper cylinder port 36 or 124 until the dotted line raised level of FIGURE 1 is reached, whereupon supplying pressure fluid to the rearward end of the horizontal cylinder 56 and exhausting it from the forward end 58 thereof causes the piston rod 50 and rack to move forward (FIGURE 2), swinging the work-carrying vacuum cup 74 counterclockwise back to its solid line position of FIGURE 2, but still at its elevated level. Pressure fluid is now supplied to the upper cylinder port 36 or 154 and exhausted from the lower cylinder port 26 or 128 to cause the piston rod 62 or 154 to descend, with the workpiece still gripped by the suction of the vacuum cup 74. As soon as the valve member 82 engages either the tripping plunger 96 of FIGURE 1 or the roller 108 of FIGURE 4, it swings counterclockwise around its pivot pin 84, uncovering the port 76 and consequently breaking the vacuum in the vacuum cup 74 so as to release the workpiece and cause it to drop onto a place of disposal, such as a conveyor or other receptacle. The foregoing cycle of operations is then repeated indefinitely for the removal of workpieces from one location to another. The feeding of workpieces from the solid line location of FIGURE 1 to the dotted line position of FIGURE 2 and the discharge thereof into a desired receptacle, machine or other location is accomplished by reversing the sequence of the above-described steps of operation.

The further modified work transfer device, generally designated 160, shown in FIGURES 8, 9 and 10, like the work transfer device 120 of FIGURES 6 and 7, employs the same swivel block 66, tubular arm 70 and vacuum work gripping cup 74 as the work transfer device 10 of FIGURES 1 to 5 inclusive, hence this is also omitted from the showing in FIGURES 8, 9 and 10 in order to simplify the drawing. The work transfer device 160 differs principally from the devices 10 and 120 in employing a rotary fluid motor to swing the work pickup arm instead of the reciprocatory fluid pressure motors and racks and pinions of the devices 10 and 120. In particular, the work transfer device 160 includes a casing 162 having a base plate 164, a rectangular side wall structure 166 and a rectangular top plate 168 bolted together and grooved and sealed by O-rings 170. The side wall structure 166 contains a vertical cylindrical bore 172 and the top and bottom plates 168 and 164 are bored and counterbored and sealed by O-rings to rotatably support a rotary cylinder 174 also sealed by O-rings. The rotary cylinder 174 contains a bore 176 of square cross-section which reciprocably receives a piston head 178 likewise of square cross-section and mounted on the lower end of a cylindrical piston rod 180 which, as with the other embodiments of the invention, is transversely drilled at its upper end for the reception of the pin 69 (FIGURE 1) connecting it to the swivel block 66. The piston head 178 is identical in construction with the piston head 142 of FIGURE 6, hence requires no further description.

Welded or otherwise secured to the exterior of the rotary cylinder 174 is a vane structure 182 consisting of a pair of substantially radial parallel vanes 184 with a packing 186 compressed between them and engaging the bore 172 in the side wall structure 166. Rotation of the vane structure 182 is limited by a pair of circumferentially-spaced stops 188 which also serve as partitions extending from top to bottom and bolted between the top and bottom plates 168 and 164. Ports 190, 192 and 194 are provided beneath the stop partitions 188 for the inlet and outlet of the pressure fluid, such as compressed air, which is the working fluid for actuating the device 160.

The operation of the further modified work transfer device 160 is generally similar to that described above for the work transfer devices 10 and 120, except for the swinging of the work transfer arm 70. Raising and lowering thereof is accomplished, as in the work transfer device 120, by the upward and downward motion of the piston head 178 and piston rod 180 by compressed air admitted at one end of the rotary cylinder 174 and exhausted from the other end thereof. Rotation or swinging of the swivel block 66 and work transfer arm 70 is, however, accomplished by admitting compressed air to one of the ports 190 or 194 and exhausting it from the other, depending upon the direction of swing desired.

FIGURE 11 shows a magnetic workpiece pickup device, generally designated 200, which is interchangeable with the vacuum cup pickup device 74 shown in FIGURES 1, 2 and 3. The device 200 consists of a swivel block 202 similar in purpose to the swivel block 66 and similarly bored vertically at 204 to receive the upper end 65 of the piston rod 62, and is similarly pinned thereto. Secured to the swivel block 202 and extending horizontally therefrom is an arm 206 which terminates in a boss or head 208 bored to receive a cup-shaped permanent magnet 210, such as an aluminum-nickel-cobalt alloy magnet, known commercially as Alnico. The magnet 210 is bored and counterbored to receive a reciprocable workpiece ejector pin 212, the opposite end of which is engaged by the curved outer contact end 214 of an ejection lever 216 pivoted intermediate its opposite ends at 218 to the arm 206. The lever 216 at its inner end terminates in a curved contact portion 220 which engages a stop 222 when the plunger 65 moves the arm 206 toward the stop 222.

In operation, the workpiece, which is assumed to be of magnetically-attracted ferrous metal, is engaged by the permanent magnet 210 when the latter comes into close proximity to it, and holds the workpiece throughout the work transfer operations previously described. At the end of the operation steps, the motion of the plunger 65 carries the swivel block 202 and arm 206 toward the stop 222, bringing the inner end 220 of the ejection lever 216 into engagement with the stop 222. This action rocks the lever 216 around its pivot 218, causing the outer end 214 to push the ejector pin 212 out of the magnet 210, ejecting the workpiece from contact with the magnet.

I claim:

1. A lifting and swinging work transfer device, comprising
   a housing,
   a workpiece-lifting fluid pressure motor having a cylinder rotatably mounted in said housing and having fluid-operating ports therein adapted to be connected to a source of pressure fluid and also having a workpiece-lifting piston reciprocably mounted in said cylinder,
   a workpiece lifting plunger operatively connected to said piston for motion upward and downward thereby and drivingly connected to said cylinder for rotation therewith,
   a workpiece lifting arm mounted on said plunger for travel therewith,
   a workpiece gripper mounted on said arm remote from said plunger,
   means responsive to the travel of said arm and plunger to a predetermined position for ejecting the workpiece from the workpiece gripper,
   and mechanism including a workpiece-swinging fluid-pressure motor operatively connected to said cylinder for rotating said cylinder and correspondingly swinging said plunger and arm.

2. A lifting and swinging work transfer device, according to claim 1, wherein said cylinder-rotating mechanism includes a pinion drivingly connected to said cylinder, wherein said workpiece-swinging fluid-pressure motor is a reciprocatory fluid pressure motor having a reciprocatory piston therein, and wherein a rack is operatively connected to said piston and meshes with said pinion.

3. A lifting and swinging work transfer device, comprising
   a housing,
   a cylinder rotatably mounted in said housing and having fluid ports therein,
   a workpiece lifting plunger repicrocably mounted in said cylinder for motion upward and downward relatively thereto and drivingly connected to said cylinder for rotation therewith,
   a workpiece lifting arm mounted on said plunger for travel therewith,
   a workpiece gripper mounted on said arm remote from said plunger,
   means responsive to the travel of said arm and plunger to a predetermined position for ejecting the workpiece from the workpiece gripper,
   and mechanism including a fluid-pressure motor operatively connected to said cylinder for rotating said cylinder and correspondingly swinging said plunger and arm,
      said mechanism including a rotary fluid pressure motor connected to said cylinder and having fluid-operating ports adapted to be connected to a source of pressure fluid.

4. A lifting and swinging work transfer device, according to claim 3, wherein said rotary fluid-pressure motor includes a cylindrical chamber in said housing having fluid ports spaced circumferentially therein, and wherein an approximately radial motive member is mounted on said cylinder movable therewith in response to the admission and discharge respectively of pressure fluid into and out of said ports.

5. A lifting and swinging work transfer device, according to claim 4, wherein said motive member comprises a vane sealingly engaging the wall of said chamber, and wherein abutments are provided in said chamber for limiting the rotation of said cylinder.

6. A lifting and swinging work transfer device, comprising
   a housing,
   a cylinder rotatably mounted in said housing and having fluid ports therein,
   a workpiece lifting plunger reciprocably mounted in said cylinder for motion upward and downward relatively thereto and drivingly connected to said cylinder for rotation therewith,
   a workpiece lifting arm mounted on said plunger for travel therewith,
   a workpiece gripper mounted on said arm remote from said plunger,
   means responsive to the travel of said arm and plunger to a predetermined position for ejecting the workpiece from the workpiece gripper,
   and mechanism including a fluid-pressure motor operatively connected to said cylinder for rotating said cylinder and correspondingly swinging said plunger and arm.

said workpiece gripper including a magnet adapted to attract ferrous metal workpiece, said ejection means including an ejector element movable relatively to said magnet for pushing the workpiece away from said magnet, a movable ejector operating member being movably mounted on said arm and operating said ejector in response to the arrival of said workpiece lifting plunger at a predetermined location in its stroke.

References Cited

UNITED STATES PATENTS

| | | | |
|---|---|---|---|
| 1,750,419 | 3/1930 | Mojonnier | 214—1 |
| 2,894,647 | 7/1959 | McCorkle | 214—1 |

HUGO O. SCHULZ, *Primary Examiner.*

G. F. ABRAHAM, *Assistant Examiner.*